US005864550A

United States Patent [19]

Posti

[11] Patent Number: 5,864,550

[45] **Date of Patent: *Jan. 26, 1999**

[54] WIRELESS LOCAL AREA NETWORK SYSTEM AND RECEIVER FOR THE SAME

[75] Inventor: Jarkko Posti, Moisio, Finland

[73] Assignee: Nokia Mobile Phones Ltd., Salo, Finland

[ * ] Notice: This patent issued on a continued prosecution application filed under 37 CFR 1.53(d), and is subject to the twenty year patent term provisions of 35 U.S.C. 154(a)(2).

[21] Appl. No.: 634,501

[22] Filed: Apr. 18, 1996

[30] Foreign Application Priority Data

May 5, 1995 [FI] Finland .................................... 952185

[51] Int. Cl.[6] .................................................... H04L 12/28

[52] U.S. Cl. .......................... 370/338; 370/349; 375/200; 375/219; 375/269; 455/450; 455/464

[58] Field of Search .................................... 370/338, 319, 370/343, 445, 313, 347, 349; 375/269, 219, 220, 329, 334, 200, 206, 348, 350; 455/422, 450, 464, 32.1

[56] References Cited

U.S. PATENT DOCUMENTS

| | | | |
|---|---|---|---|
| 4,679,225 | 7/1987 | Higashiyama | 455/410 |
| 5,022,046 | 6/1991 | Morrow, Jr. | 375/200 |
| 5,175,758 | 12/1992 | Levanto et al. | 455/458 |
| 5,231,634 | 7/1993 | Giles et al. | 370/348 |
| 5,367,536 | 11/1994 | Tsujimoto | 375/269 |
| 5,379,290 | 1/1995 | Kleijne | 370/313 |
| 5,640,385 | 6/1997 | Long et al. | 370/375 |
| 5,648,982 | 7/1997 | Durrant et al. | 375/206 |

FOREIGN PATENT DOCUMENTS

| | | |
|---|---|---|
| 0 475 682 A2 | 3/1992 | European Pat. Off. . |
| 0 475 682 A3 | 3/1992 | European Pat. Off. . |
| 0 584 981 A1 | 3/1994 | European Pat. Off. . |
| 0 599 632 A2 | 6/1994 | European Pat. Off. . |
| 0 599 632 A3 | 6/1994 | European Pat. Off. . |
| 0599632 A3 A2 | 6/1994 | European Pat. Off. . |

*Primary Examiner*—Alpus H. Hsu
*Attorney, Agent, or Firm*—Perman & Green, LLP

[57] ABSTRACT

The invention relates to a wireless local area network system having data terminals and transceivers which communicate with the data terminals and transmit and receive data, for forming a wireless link between at least two data terminals, the system transmitting data as outputs in a certain frequency range. The output has a signal (B) which is visible as a narrow-band signal in the frequency range of the output. The signal (B) can be detected from farther away than a conventional output by arranging circuits (7, 8, 9) in the local area network system for filtering and detecting the narrow-band signal of a certain frequency from the received signal.

18 Claims, 3 Drawing Sheets

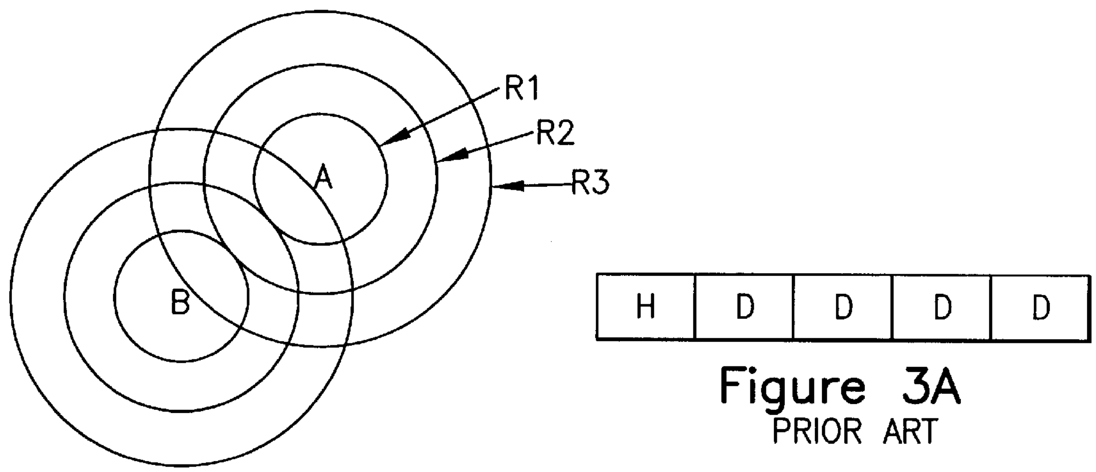
Figure 2
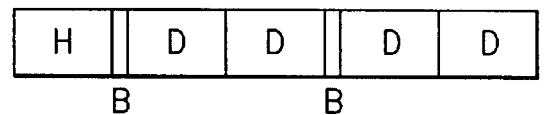
Figure 3A
PRIOR ART
H D D D D
B B
Figure 3B
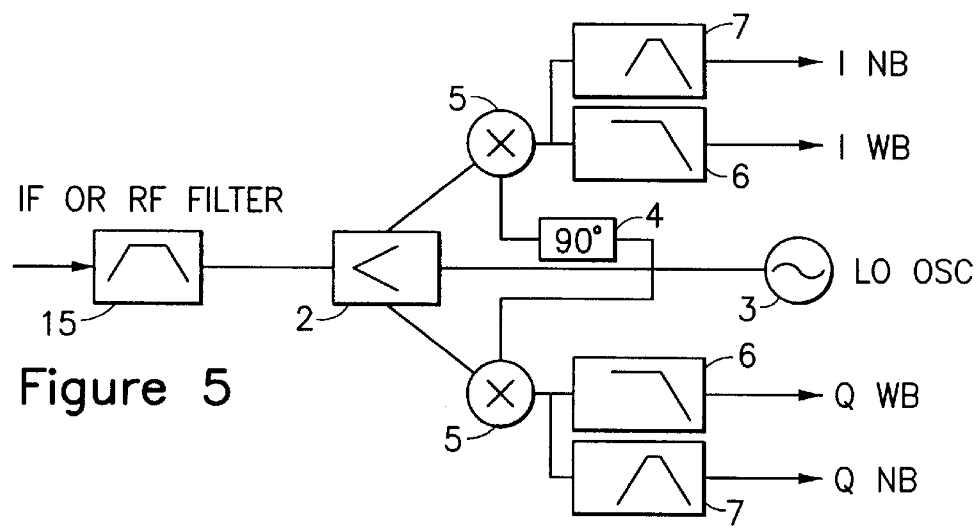
Figure 5
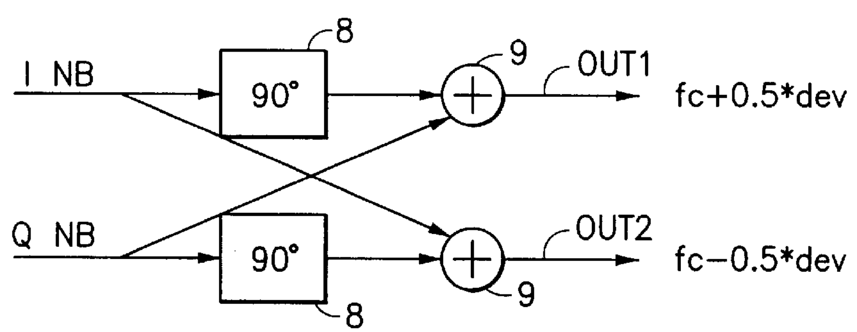
Figure 6

WIRELESS LOCAL AREA NETWORK SYSTEM AND RECEIVER FOR THE SAME

FIELD OF THE INVENTION

The invention relates to a wireless local area network system, which comprises data terminals and transceivers that communicate with the data terminals and transmit and receive data, for forming a wireless connection between at least two data terminals, and which transmits data as outputs on a certain frequency. The invention is further related to a receiver used in such system.

BACKGROUND OF THE INVENTION

In office premises there are typically different electronic devices which communicate with one another. Communication between the devices, e.g., in telephone and data network solutions, is usually implemented by using cables, whereby every time a new device is connected to the network, a new cable has to be drawn and new connectors have to be installed. Therefore, different wireless local area networks (Wireless LAN) have been developed. Wireless local area networks can be based on infrared or radio transmission so that the network for the radio transmission, for instance, is a short range radio network for computer systems based on radio links between the computers through which the computers can be connected to the network. In this solution the radio links can be used to transfer data fast, usually faster than in telephone networks. Typically, data can be transmitted even as far as 800 m. In this way, the size of the radio cell formed around each terminal is typically 50–800 meters in radius.

One example of such a wireless local area network with a decentralized control is presented in FIG. 1. The figure presents cells C1–C6, all of which comprise a wireless transceiver TR1–TR6 (e.g., a radio transceiver) and data terminal D1–D6, such as a computer connected thereto, each one forming one station of the network. Data terminal D1 functions as a central computer with which the other data terminals D2–D6 communicate. Data terminals D1–D6 thus function as terminals of the network. Data terminals D1–D6 can also communicate with an external (fixed) network, e.g., through an ATM-, ISDN- or corresponding transmission link, as terminal D6 does in FIG. 1.

One problem in such a wireless local area network comprising a decentralized control is that there is no controlled transmission between the different transceivers of different cells C1–C6. In such a network, central computer D1 communicates with all the data terminals D2–D6 wirelessly from transceiver TR1 to transceiver TR2–TR6 of each data terminal. In contrast, all the data terminals D2–D6 cannot hear one another—at least if the network is large. In this case, situations may arise where data is transmitted from several data terminals, e.g., from data terminals D2 and D3 to central computer D1 simultaneously, whereby central computer D1 is not capable of receiving either one of the transmissions. This is a problem with systems with decentralized control in which the transmission between different transceivers is not controlled centrally to be effected at different times and/or on different frequencies.

SUMMARY OF THE INVENTION

The object of this invention is to reduce these problems and, consequently, to implement a local area network where better reliability is achieved in data transmission. Another object of the invention is to implement a transmitter and a receiver which can be used to achieve a wider detection range of transmission and, consequently, better reliability in transmission and in reception. These objects can be achieved by effecting narrow peaks on the transmissions at certain intervals and on certain frequencies, i.e., by adding narrow-band signals to the outputs. The audibility range of such narrow-band signal is wider than that of broadband signals, although the amplitude of the transmission (the transmission signal) is the same. By carrying out filtering with a narrow-band filter on a certain narrow frequency range, on which it is known that the frequency of the said narrow-band signal is, the narrow-band signal according to the invention is detected from farther away than a normal transmission by an ordinary broadband filter.

By arranging narrow-band signals on the outputs at certain intervals and, correspondingly, narrow-band filters in the receivers, data transmissions coming from a station/cell can be detected from a considerably longer distance, whereby it is easier to detect from other stations/cells, whether a transmission from another cell is in progress. In this way, the other stations-/cells know not to carry out transmission simultaneously, but wait until there are no other transmissions, whereby simultaneous transmission and, consequently, loss of data are avoided.

The wireless local area network system according to the invention is characterized in that the output comprises a signal which is visible as a narrowband signal in the frequency range of the output, and the said local area network system comprises means for filtering and detecting the narrow-band signals of a certain frequency from the received signal. Correspondingly, the receiver of the wireless local area network according to the invention is characterized in that it comprises means for filtering and detecting the narrow-band signals of a certain frequency from the received signal.

BRIEF DESCRIPTION OF THE DRAWINGS

The invention is described in the following in more detail with reference to the appended drawings in which:

FIG. 2 presents the audibility range of adjacent cells,

FIG. 3A presents an ordinary output of the network and FIG. 3B that of the invention, FIG. 5 presents the receiver according to the invention, and FIG. 6 presents a detector for detecting the output according to the invention.

DETAILED DESCRIPTION OF THE INVENTION

Figure 1:
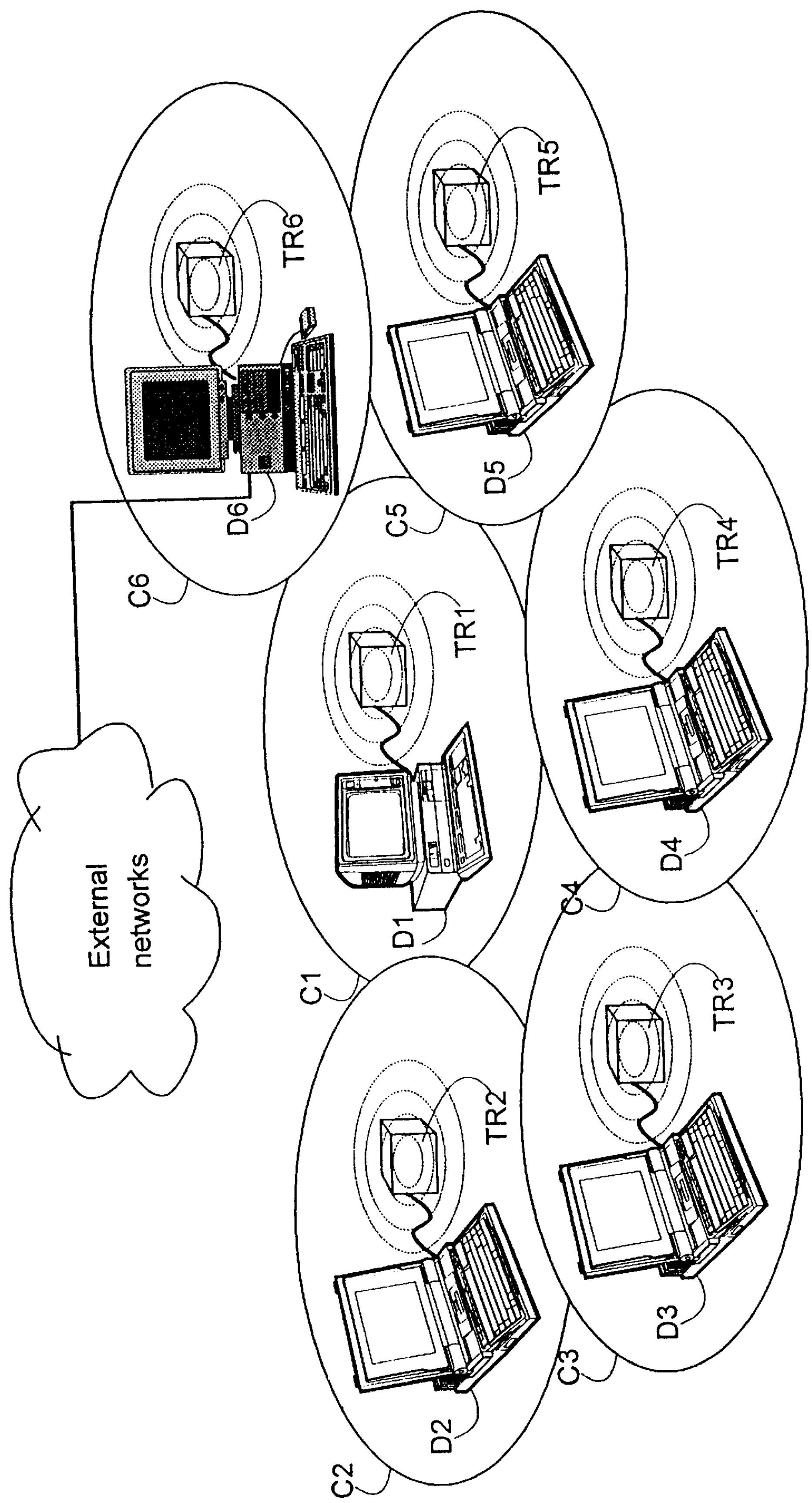
FIG. 1 presents the cells of a wireless local area network.

FIG. 2 presents two adjacent stations A and B of a wireless local area network, both of which comprise a transceiver and a data terminal, as presented in FIG. 1, forming the A and B cells. The circles drawn in FIG. 2 present the audibility of stations A and B. The innermost circles R1 present an area within which data can be received in a normal way (by a receiver). The middle circle R2 presents an area in which normal data transmission can be perceived (by a receiver) but not received. The station knows, on the basis of mere perception, that the other station is in a transmitting state and, consequently, does not start to transmit simultaneously. The outermost circle R3 presents an area in which data transmission should be perceivable in order to prevent simultaneous transmission. This has not been possible heretofore by using the solutions of prior art.

According to the invention, narrow peaks are caused at certain intervals on the transmissions and on a certain frequency, i.e., signals are added to the outputs which are visible as narrow-band signals in the reception. The audibility range of such a narrow-band signal is wider than that of a broadband signal, although the amplitude of the transmission and the signal are the same. By effecting filtering using a narrow-band filter in a certain narrow frequency range, in which the frequency of the said narrow-band signal is is known to be, a narrow-band signal according to the invention is perceived from farther away than normal transmission using a conventional broadband filter, whereby the audibility range of the station presented in FIG. 2 can be broadened into the size of circle R3.

The narrow-band signal according to the invention can be implemented by adding, to a normal output, in the case of an FSK transmission (Frequency Shift Keying), for instance, a predefined bit sequence, preferably consisting of a few sequential 1-bits or 0-bits, e.g., 5 bits ('11111' or '00000') or 10 bits ('1111111111' or '0000000000'). Such a bit sequence, which is also called a band-active block here, can be placed at any point in the output, preferably among the data bits. It is preferable to place the bit sequences in the transmitted bit packets at certain intervals, whereby the receivers of the stations are able to perceive at regular intervals whether another station is transmitting. The sequences need not to be placed at regular intervals; instead they can be situated at varying intervals or at combinations thereof, e.g., so that they exist at certain points (e.g., between data bits) at regular intervals and elsewhere at varying or random intervals. A sequence can be placed in an output, e.g., at the intervals of 200 bits, whereby there are 200 bits (data bits or other bits) in the transmitted signal, then a 10-bit sequence (a band-active block) can be placed there, for instance, and again 200 normal bits which belong to the transmission, and a band-active block according to the invention, etc. There might even be points in the output where no such extra sequence needs to be added, namely, if there already is a bit sequence in the output which causes a narrow-band signal in the reception spectrum. Such a bit sequence can be perceived in the transmitter by using a controller that directs its operation, or in a channel coder when the output is coded for transmission. In this case, the controller detects that no sequence according to the invention needs to be added to the place in question. Those skilled in the art know these digital transmitters from, e.g., GSM mobile phones, which comprise controllers that direct the operation and channel coders for the channel coding. If there is already a bit sequence in the output which causes a narrow-band signal in the reception spectrum, the output can be perceived from farther away by using the receiver according to the invention which comprises a narrow-band filter.

FIG. 3A presents, a typical output of a digital system which comprises header field H in the beginning thereof and, thereafter, data bits which can be divided into sequential data blocks D. FIG. 3B presents, an output according to the invention in which signal B is added to the output, causing a peak, i.e., a narrow-band signal on a certain frequency, in the output. In the case of the digital system, a signal according to the invention, i.e., the band-active block B herein, is added to the output, as presented in FIG. 3B, e.g., between header field H and data block D, or between two data blocks.

When frequency modulation is used in the transmission, a peak is formed in the frequency spectrum due to the modulation in the added sequence according to the invention, i.e., in the band-active block. The peak is formed on a certain frequency which is, with the sequence comprising 1-bits, carrier frequency ($f_c$)+0.5* deviation of the output (frequency deviation), and with the sequence comprising 0-bits, carrier frequency ($f_c$)–0.5* deviation. It is preferable to include in the sequence both a 1-bit sequence and a 0-bit sequence sequentially, e.g., 5 or 10 0-bits, and 5 or 10 1-bits (e.g., '0000011111'), whereby two peaks are formed in the frequency spectrum: first on frequency $f_c$–0.5* deviation and then on frequency $f_c$+0.5* deviation, in which $f_c$ is the carrier frequency. Of these two peaks, the receiver is able to determine the edge point between a 0-bit sequence and a 1-bit sequence, and through this it is easier for the receiver to maintain the right timing.

Figure 4A:
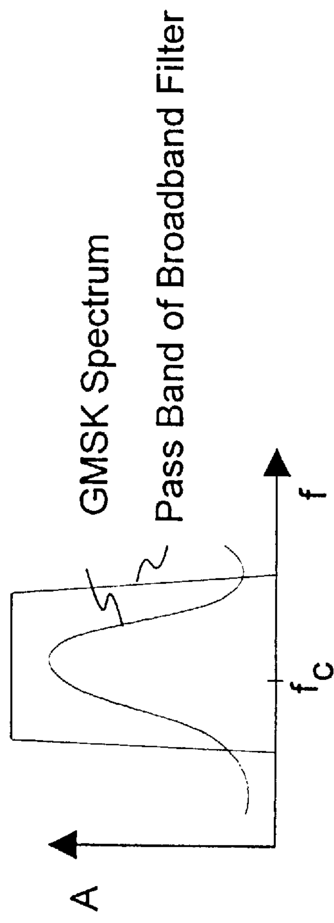
FIG. 4A–4C presents the frequency spectrum of a received signal.
Figure 4B:
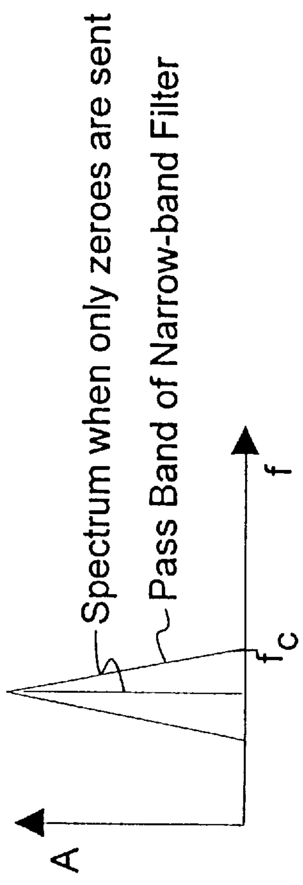
Figure 4C:
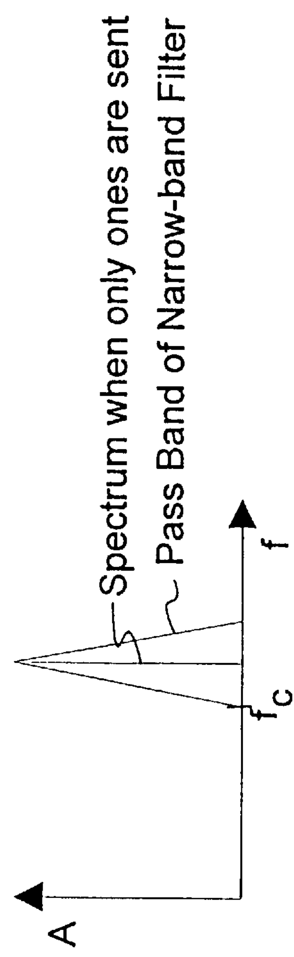

FIGS. 4A–4C presents frequency spectrums of a transmission. FIG 4A presents a broadband spectrum of a normal transmission when the transmission is, e.g., GMSK-modulated (Gaussian Minimum Shift Keying), and the passband of a broadband filter. FIG. 4B presents a peak caused by the above-mentioned 0-bit sequence (when only zeroes are sent) and the passband of a narrow-band filter, and FIG. 4C presents a peak caused by the above-mentioned 1-bit sequence (when only ones are sent) and the pass band of a narrow-band filter. The X-axes in FIGS. 4A–4C present the frequency and the Y-axes the amplitude of the signal.

The audibility range of such a peak is wider than that of a broadband signal, although the amplitude of the transmission and the signal are the same. By effecting filtering using a narrow-band filter on a certain narrow frequency range, in which the frequency of the said narrow-band signal is known to be, the narrowband signal according to the invention is detected from farther away than a normal transmission by a conventional broadband filter.

FIG. 5 presents the receiver according to the invention for receiving and detecting a peak included in the output according to the invention. The receiver is described in the following only briefly because the structure of such a receiver is otherwise known to those skilled in the art, but for the purposes of the invention, narrowband band pass filter 7 connected parallel to conventional filter 6 is placed after modulation mixers 5 for filtering the peak according to the invention. From narrow-band filter 7, the signal is sent to a detector, which is presented in FIG. 6, for detecting the level, on the basis of which it can be determined whether an output of another station is being received, and if it is, a transmission is not started.

A signal that has reached the antenna is being received in FIG. 5; the signal here is assumed to have already been mixed, either after the antenna (not shown) from radio frequency into an intermediate frequency, or it can be brought directly from a pre-amplifier (not shown) as a radiofrequency signal. At first, the signal is sent to filter 1 which is either an RF- or an IF-filter (IF, intermediate frequency) for receiving a signal of a desired frequency, after which it is typically divided into two branches, i.e., I- and Q-branches. The division is effected by using power divider 2. The signal received normally by a baseband signal obtained from local oscillator 3 is modulated into a baseband signal by using mixers 5. The signals of the I- and Q-branches are brought into a 90 degree mutual phase shift which is effected by phase shifting the mixer signal of one of the branches by using phase shifter 4. Desired baseband signals are selected from the outputs of mixers 5 by using broadband filter 6, such as a low pass filter, from which output I WB is obtained in the I-branch, and output Q WB is obtained in the Q-branch. The signal causing a peak in the spectrum and added to the output according to the invention is filtered in the frequency range of the peak by using a passing narrow-band bandpass filter 7, from which output I NB is obtained in the I-branch, and output Q NB is obtained in the Q-branch.

A level detection is carried out on the signal obtained from narrow-band filter 7 by using, e.g., a known AM-detector (Amplitude/Modulation detector), in which the signal of the I-branch is phase shifted by 90 degrees in phase shifter 8 and added to the signal of the Q-branch in adder 9, whereby a peak caused by a 1-bit sequence can be detected as first output OUT1 on frequency $f_c$+0.5* deviation. Correspondingly, the signal of the Q-branch is phase shifted by 90 degrees in phase shifter 8 and added to the signal of the Q-branch in adder 9, whereby a peak caused by a 0-bit sequence can be detected as second output OUT2 on frequency $f_c$−0.5* deviation. In this case, if bit sequence '1111100000' was added to the output as a band-active block, the second output OUT2 is active first, and then the first output OUT1.

The signal according to the invention which is visible as a narrow-band signal can be added to the output in the transmitter by using a controller directing the operation of the transmitter, the controller adding a desired bit sequence to the output either in certain positions or at random on the basis of an algorithm, for instance. The adding of the desired bits in a digital transmitter is known per se to those skilled in the art.

The narrow-band signal according to the invention could also be added to an output in an analog system, whereby an analog signal of a certain frequency is formed in the transmitter by using, e.g., a frequency synthesizer, and the signal in question is added at certain intervals to a normal carrier wave. The forming of such an analog signal of a certain frequency and adding it to the carrier wave are also known per se to those skilled in the art.

By arranging in the outputs, according to the invention, signals causing narrowband peaks at certain intervals and, correspondingly, narrow-band filters in the receivers, a data transmission coming from one station can be detected from considerably farther away in a wireless local area network comprising a distributed control, whereby it is easier for the other stations to detect whether an other station is sending data. By using the solution according to the invention, it is not possible to receive data flawlessly from farther away, but the transmission of another station can be detected from farther away. Therefore, the other stations know not to transmit simultaneously but wait until there is no other transmission, whereby simultaneous transmissions are avoided, as well as collisions caused by them and, consequently, loss of data.

What is claimed is:

1. A wireless local area network system comprising data terminals (D1–D6) and transceivers (TR1–TR6) that communicate with the data terminals and transmit and receive data, for forming a cordless link between at least two data terminals, the system sending data as output signals in a certain frequency range, characterized in that an output signal comprises a signal (B) that is visible as a narrow-band signal in the frequency range of the output signal, and said local area network system comprises means (7,8,9) for filtering and detecting the narrow-band signal of a certain frequency from the received signal, said narrow-band signal being detectable at a greater range by other transceivers of the same wireless local area network system than a data portion of the output signal for indicating an on-going transmission of the output signal.

2. A local area network system according to claim 1, characterized in that data is transmitted as digital bit packets and the packets comprise a bit sequence (B) which is visible as the narrow-band signal in the frequency range of the output.

3. A local area network system according to claim 2, characterized in that said bit sequence (B) is predefined.

4. A local area network system according to claim 2, characterized in that said bit sequence (B) occurs at a plurality of points in the transmitted digital bit packet.

5. A local area network system according to claim 4, characterized in that said bit sequence (B) occurs at predefined intervals in the transmitted digital bit packet.

6. A local area network system according to claim 4, characterized in that said bit sequence (B) occurs at random intervals in the transmitted digital bit packet.

7. A local area network system according to claim 1, characterized in that said signal (B) is visible as a peak in the frequency spectrum of the received signal.

8. A local area network system according to claim 2, characterized in that said bit sequence (B) comprises at least two sequential 1-bits.

9. A local area network system according to claim 2, characterized in that said bit sequence (B) comprises at least two sequential 0-bits.

10. A local area network system according to claim 2, characterized in that said bit sequence (B) comprises at least two sequential 1-bits and 0-bits.

11. A receiver of a wireless local area network, comprising means (1) for receiving a signal of a reception frequency in a reception frequency range. characterized in that said receiver comprises means (7, 8, 9) for filtering and detecting a narrow-band signal of a certain frequency from the received signal and means, responsive to detecting the narrow-band signal, for inhibiting a transmitter from transmitting a wider-band signal, wherein said narrow-band signal is detectable at a greater range by other receivers of the same wireless local area network than a data portion of the output signal for indicating an on-going transmission of the output signal.

12. A wireless local area network, comprising:

a plurality of wireless transceivers each comprised of a transmitter and a receiver;

each said transmitter being coupled to a source of digital data for transmitting the digital data as a transmission signal during a transmission period, the transmission signal comprising a digital data portion that is transmitted at a first transmission frequency and with a first bandwidth, and further comprising at least one transmission in progress indicator that is transmitted at a second frequency that deviates from the first frequency and with a second bandwidth that is narrower than the first bandwidth, the transmission in progress indicator being detectable at a greater range than the digital data portion of the transmission signal by other receivers of the same wireless local area network f or indicating an on-going transmission of the transmission signal; and each said receiver comprising a filter having an output coupled to an input of a detector f or detecting a presence of a received transmission in progress indicator and for inhibiting an operation of the corresponding transmitter during the transmission period of another transmitter.

13. A wireless local area network as in claim 12, wherein the digital data is transmitted as packets of digital data that comprise a bit sequence that defines the at least one transmission in progress indicator.

14. A wireless local area network as in claim 13, wherein the bit sequence occurs at one of predetermined intervals or random intervals.

15. A wireless local area network as in claim 13, and further comprising means, responsive to a determination that a predetermined bit sequence occurs in the digital data of a packet, for inhibiting the transmission of the bit sequence that defines the transmission in progress indicator.

16. A wireless local area network as in claim 13, wherein the bit sequence is comprised of a plurality of one bits that are preceded by or followed by a plurality of zero bits.

17. A wireless local area network as in claim 12, wherein said receiver is comprised of an In-phase branch and a Quadrature-phase branch, wherein said filter is comprised of a narrow-band filter in each said branch, and wherein said detector is coupled to an output of each of said narrow-band filters.

18. A wireless local area network as in claim 17, wherein said detector is comprised of an Amplitude Modulation detector.

* * * * *